Nov. 7, 1933.                G. C. PAHLOW                1,934,323
                          GRAVE VAULT HANDLE
                          Filed Nov. 8, 1930

Inventor
G. C. Pahlow
By CA Snow & Co.
Attorneys.

Patented Nov. 7, 1933

1,934,323

UNITED STATES PATENT OFFICE 1,934,323

GRAVE VAULT HANDLE

Gustav C. Pahlow, Galesburg, Ill., assignor to Victor Casket Hardware Company, Galesburg, Ill.

Application November 8, 1930. Serial No. 494,404

1 Claim. (Cl. 16—112)

This invention aims to provide a novel means for fastening a handle to a grave vault.

Figure 1:
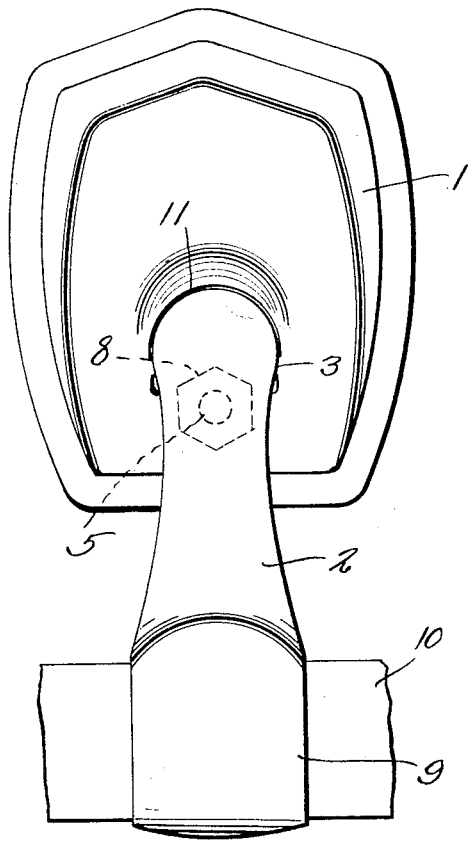
Figure 1 is a front elevation.
Figure 2:
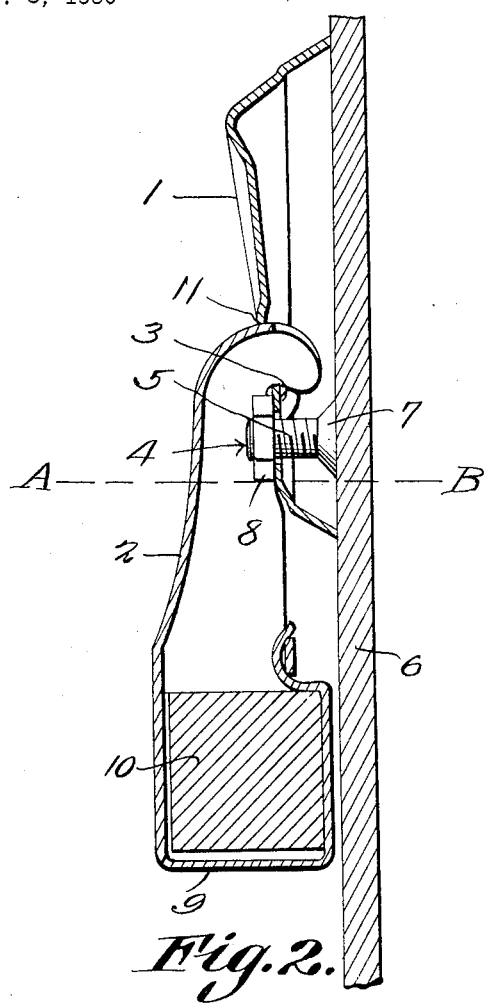
Figure 2 is a vertical section.
Figure 3:
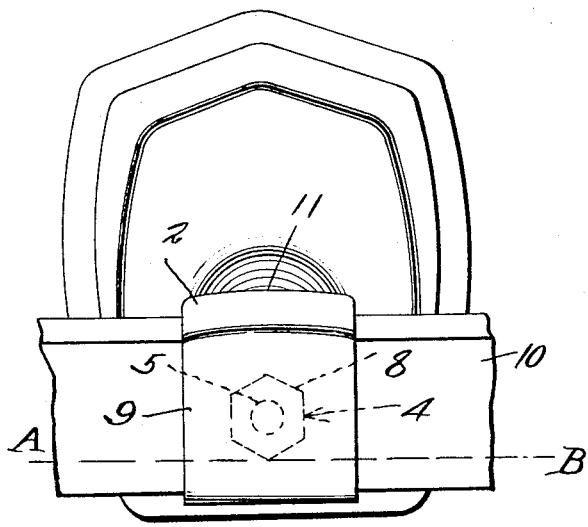
Figure 3 is a front elevation, with the handle raised from the position of Figure 1.

A handle 2 is connected to a handle plate 1 for vertical swinging movement, by any suitable means 3, such as that shown in my Patent 1,302,423, and when the handle is lowered and hangs at the side of the mortuary receptacle, no bolts, screws, holes or fastening devices can be seen, and it is therefore proper to state that the handle plate 1 is imperforate of holes for securing devices where exposed with respect to the handle, when the handle is lowered.

A single securing device 4 passes through the handle plate 1, and may be in the form of a screw stud 5, the enlarged head 7 of which is welded to the outside of the mortuary receptacle 6, which generally, is the metal bell or body of a grave vault, which is lowered to place on a base (not shown) in the grave over the coffin. On the outer end of the stud or securing device 5 is threaded a nut 8, which engages the outer surface of the handle plate 1.

The securing device 5—8, and more specifically its outer end, is located immediately behind the handle 2, when the handle is lowered, whereby the handle will conceal the outer end of the securing device when the handle is lowered.

By way of summary it may be stated that the device embodies a mortuary receptacle 6, the handle plate 1, a handle 2 including a trough-shaped portion, a pivotal connection 3 between the handle and the handle plate, a stud 5 permanently secured to the outer surface of the receptacle and passing through the plate, the stud being located below the pivotal connection, and a nut 8 threaded on the stud and engaging the plate to hold the plate on the receptacle. The side walls of the trough-shaped portion of the handle 2 completely house the nut 8 from view, and cooperate with the nut to limit the rotation of the nut and prevent its detachment from the stud, when the handle is lowered, in that the longest transverse dimension of the nut is greater than the distance between the side walls of the handle. Moreover, the entire securing means is hidden by the handle, when the handle is raised. With this end in view, the handle 2 is provided with a depending socket 9 for the handle bar 10, and the socket 9 extends downwardly below a horizontal line A—B touching the lowermost portion of the securing device 4—8 when the handle is raised to a substantially horizontal position, whereby the socket 9, aided by the handle bar 10, will lie immediately in front of the outer end of the securing device 4—8 and hide it, when the handle 2 is in an approximately horizontal position.

The handle 2, when raised, engages with the handle plate 1 at the point 11, when the handle is in an approximately horizontal position, and thereby the socket 9 is enabled to function as a hiding means for the outer end of the securing device 5—8, as aforesaid.

What is claimed is:

In a device of the class described a mortuary receptacle, a handle plate, a handle including a trough-shaped portion, a pivotal connection between the handle and the plate, a stud permanently secured to the outer surface of the receptacle and passing through the plate, the stud being located below the pivotal connection, and a nut threaded on the stud and engaging the plate to hold the plate on the receptacle, the side walls of said trough-shaped portion of the handle completely housing the nut from view and cooperating with the nut to limit the rotation of the nut and prevent its detachment from the stud, when the handle is lowered.

GUSTAV C. PAHLOW.